United States Patent [19]

Schonegg

[11] 3,854,093

[45] Dec. 10, 1974

[54] TRANSCEIVER CHANNEL SELECTOR

[75] Inventor: Louis E. Schonegg, Indianapolis, Ind.

[73] Assignee: Regency Electronic, Inc., Indianapolis, Ind.

[22] Filed: Apr. 20, 1973

[21] Appl. No.: 353,140

[52] U.S. Cl. .................... 325/18, 325/184, 331/161

[51] Int. Cl. .................... H04b 1/40

[58] Field of Search .................... 325/15, 17, 18, 19, 20, 325/25, 184; 331/154, 158, 161

[56] References Cited

UNITED STATES PATENTS

| | | | |
|---|---|---|---|
| 2,840,714 | 6/1958 | Wulfsberg | 325/18 X |
| 3,248,652 | 4/1966 | Kruse | 325/430 |
| 3,413,554 | 11/1968 | Yates | 325/25 X |

*Primary Examiner*—Benedict V. Safourek

*Attorney, Agent, or Firm*—Shlesinger, Arkwright, Garvey & Dinsmore

[57] ABSTRACT

The invention pertains to means for selecting transmit and receive frequencies in a multi-channel transceiver. The superheterodyne-type receiver includes a mixer and a crystal controlled oscillator to provide a variable frequency signal to the mixer, while the transmitter employs a separate crystal control oscillator to provide an appropriate signal to the modulator. Elements of a first bank of crystals are individually connected to the mixer oscillator by the action of two stepping switches which are alternately operable, through the action of a load switch, to forwardly bias a diode connected in series between one of the crystals and the oscillator. A mode switch grounds one side of either of the stepping switches to render it capable of biasing the diode into conduction. A second bank of crystals is selectively connected to the modulator oscillator by means of a third stepping switch which is mechanically ganged to one of the receive stepping switches. In one mode of operation, the receive stepping switch which is ganged into the transmit stepping switch is rendered operable by the mode switch so that a receive channel is automatically selected along with a particular transmit channel. In the alternate mode of operation, the receive switch, which is independently actuated, is connected to ground, thereby permitting the selection of a receive channel independently of the choice of a particular transmit channel.

14 Claims, 3 Drawing Figures

TRANSCEIVER CHANNEL SELECTOR

BACKGROUND OF THE INVENTION

With the widespread use of two-way radio communication, it has become necessary to provide transceivers with the capability for transmitting and receiving in a number of frequency bands in order to effectively communicate in a plurality of nets or in an area where radio traffic is heavy. Also, it is desirable to be able to switch from channel to channel rapidly and accurately without the necessity for employing difficult or unwieldly tuning procedures.

One approach has been to provide a multi-channel transceiver with multiple position selector switches which automatically set the transmitter and/or receiver sections to the proper frequency. It is common practice in transceivers of this type to employ the selector switches to place a crystal of particular frequency characteristics in the circuit of the crystal controlled oscillators associated with the receiver mixer and the transmitter modulator.

To facilitate communication between two transceivers, some of the prior art devices associate a certain transmit frequency with a certain receive frequency so that the transmit frequency of the second unit is the receive frequency of the first unit, and the receive frequency of the second unit is the transmit frequency of the first. Other devices, however, require that the transmit and receive channels be selected independently.

There are inherent difficulties with both of the last mentioned channel selector arrangements. In the first instance, since there are only as many frequency combinations available as there are transmit or receive channels, the capacity of the transceiver is substantially limited. In the second instance, the user must always correlate the transmit and receive frequencies for the particular station he is communicating with to assure two-way operation. One arrangement suffers from inflexibility and the other from lack of ease in channel selection.

OBJECTS OF THE INVENTION

It is, therefore, an object of this invention to provide transceiver channel selection means wherein the transmit frequency and the receive frequency may be selected independently of one another, or in the alternative, the selection of the transmit or receive frequency will automatically effect selection of the corresponding receive or transmit frequency, respectively.

Another object of this invention is to provide transceiver channel selection means wherein the transmit and receive frequencies are determined by the selective connection of crystals in the first crystal bank to the receive section and the selective connection of crystals in a second crystal bank to the transmit section, thereby achieving rapid and accurate channel selection without the necessity for fine tuning.

A further object of this invention is to provide transceiver channel selection means wherein the frequency control crystals are introduced by means of bi-state electronic switches.

A still further object of this invention is to provide transceiver channel selection means wherein the channels are selected by a single control.

Yet another object of this invention is to provide a transceiver channel selector wherein power consumption is minimized.

A further object of this invention is to provide channel selection means wherein good electrical contact between the frequency control crystals and the oscillator is maintained at all time.

SUMMARY OF THE INVENTION

The invention relates to channel selector means for a transceiver having a transmitter including a modulator and a receiver including a frequency mixer. The channel selector includes a first oscillator which has its output connected to the mixer and a second oscillator which has an output into the modulator. A first frequency determining section, which includes a first plurality of frequency resonant elements, causes the receive oscillator to oscillate at one of a first plurality of selected frequencies whereas a second frequency determining section, which includes a second plurality of frequency resonant elements, causes the transmit oscillator to oscillate at one of a second plurality of selected frequencies. Alternatively operable selection means select a particular resonant element from the first plurality of frequency resonant elements to determine the receive oscillator frequency. A transmit selection means is capable of selecting a particular resonant element from the second plurality of frequency resonant elements to determine the frequency of the transmit oscillator. A switch is provided for alternatively rendering either of the first selection means operable and the other inoperable. The channel selector includes means for actuating one of the receive selection means to select a particular resonant element from the first plurality of resonant elements as well as means for simultaneously actuating the other of the receive selection means and the transmit selection means to select a particular resonant element from the first and second plurality of frequency resonant elements, respectively.

DESCRIPTION OF THE INVENTION

Figure 1:
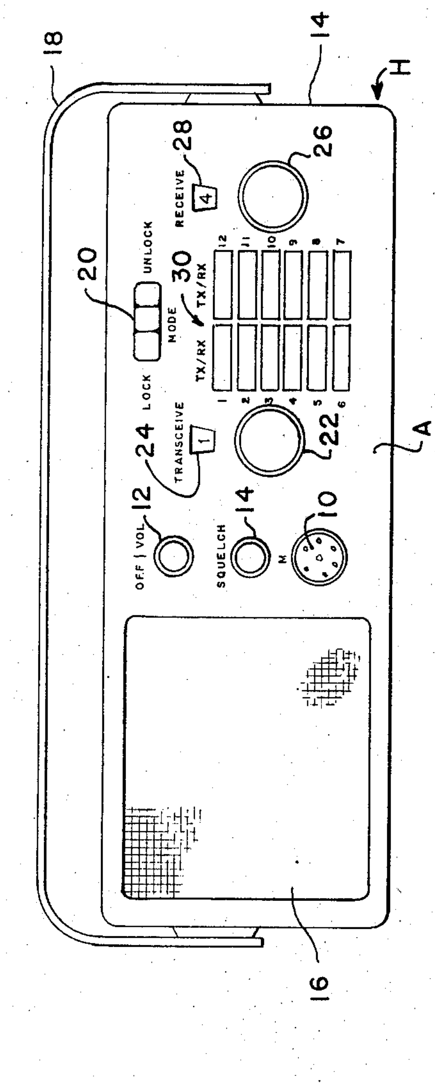
FIG. 1 is a front elevational view of an appropriate housing for the invention.

FIG. 1 illustrates the housing H and front panel A of a transceiver employing the present invention. Receptacle 10 is adapted to receive the output connector of a standard push-to-talk microphone which may be located remotely therefrom by means of an appropriate cord. Off-on switch and volume control 12 and squelch control 14 may regulate the input and output levels and noise suppression, respectively, in any manner known in the art. Speaker 16 may be located on front panel A or at any point remote therefrom. The housing H may be mounted to a vehicle or the like by means of bracket 18.

When mode switch 20 is in the position shown, rotation of selector knob 22 will select both the transmit and receive frequencies assigned to the channel number shown in window 24. If mode switch 20 is in the "UNLOCK" position however, the transmit frequency is selected by rotating knob 22 and the receive frequency by rotating knob 26. In the "UNLOCK" position, the transmit frequency will be that which is assigned to the channel number shown in window 24 and a receive frequency will be that assigned to the channel number shown in window 28. The transmit and receive channel pairs may be placed on chart 30 for quick reference.

Figure 2:
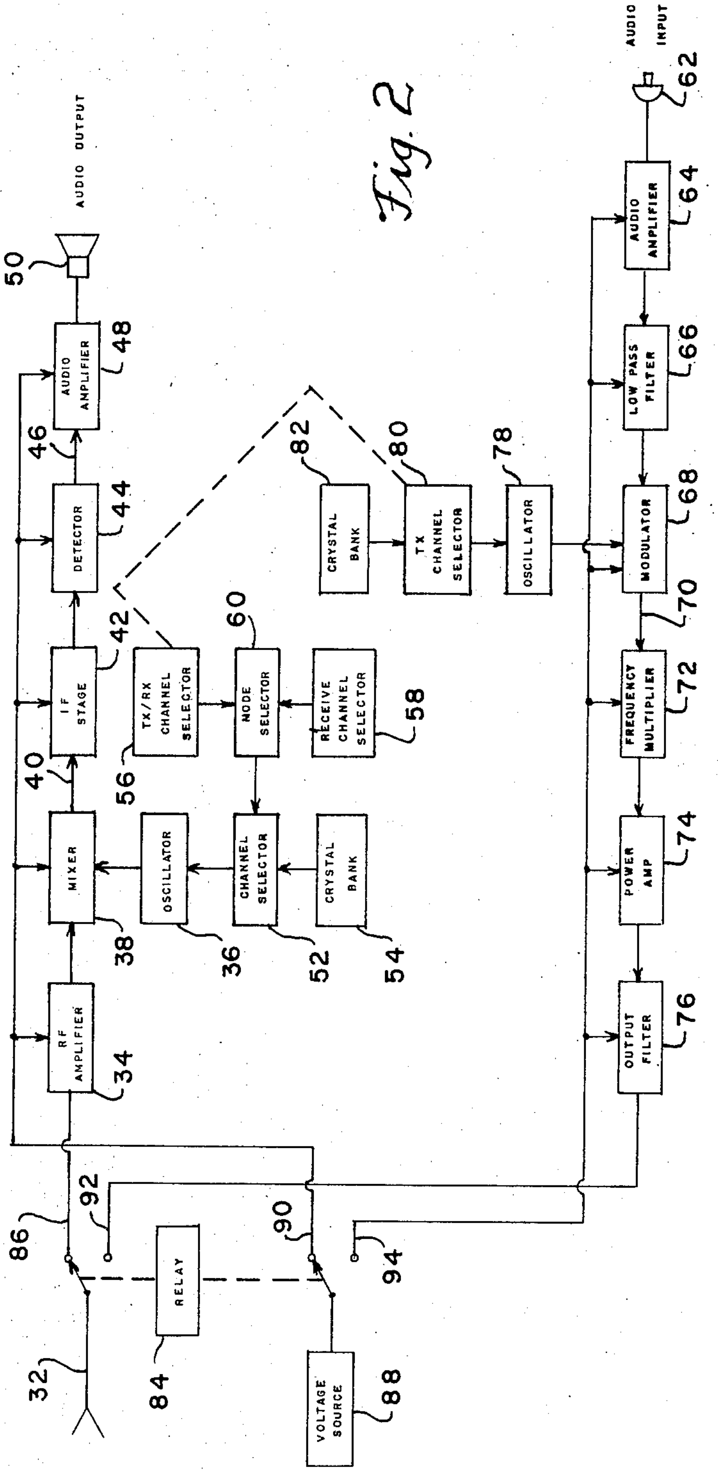
FIG. 2 is a block diagram of a transceiver including the channel selector means of the present invention.

In FIG. 2, incoming signals received by antenna 32 are amplified in radio frequency amplifier 34 and mixed with a frequency from crystal controlled oscillator 36 in mixer 38 to deliver an IF signal 40 in a manner well known in the art. The resulting IF frequency signal is further mixed and amplified in IF stage 42 and detected in detector 44. The output 46 from detector 44 is an audio signal which is then amplified by audio amplifier 48 and delivered to speaker 50.

Oscillator 36 is designed to oscillate at any one of a number of frequencies according to the crystal selected by channel selector 52 from crystal bank 54. The channel selector 52 is controlled by either transmit/receive channel selector 56 or receive only channel selector 58 depending on the state of mode selector switch 60.

Turning now to the transmit section, audio input from microphone 62 is amplified by audio amplifier 64, filtered by low pass filter 66 and passed to modulator 68 where it is impressed on a carrier. The modulated signal 70 undergoes frequency multiplication at 72, amplification by RF amplifier 74, and, finally, filtering at 76. Oscillator 78 oscillates at a frequency dependent on the crystal selected from crystal bank 82 by transmission channel selector 80. The output signal from oscillator 78, which corresponds to the frequency of oscillation thereof, is supplied to modulator 68. Channel selectors 56 and 80 are mechanically ganged by any suitable means so that they are actuated in unison.

Antenna 32 may be utilized for either transmission or reception through the action of push-to-talk relay 84. When relay 84 is in the receive position (as shown), antenna 32 is connected to RF amplifier input 86 and voltage source 88 is connected to the receiver supply bus 90. When relay 84 is in the transmit position, antenna 32 is connected to transmitter output line 92 and power source 88 is connected to transmitter supply bus 94. Since power source 88 is alternately connected to the transmit and receive sections, power usage is kept to a minimum.

Figure 3:
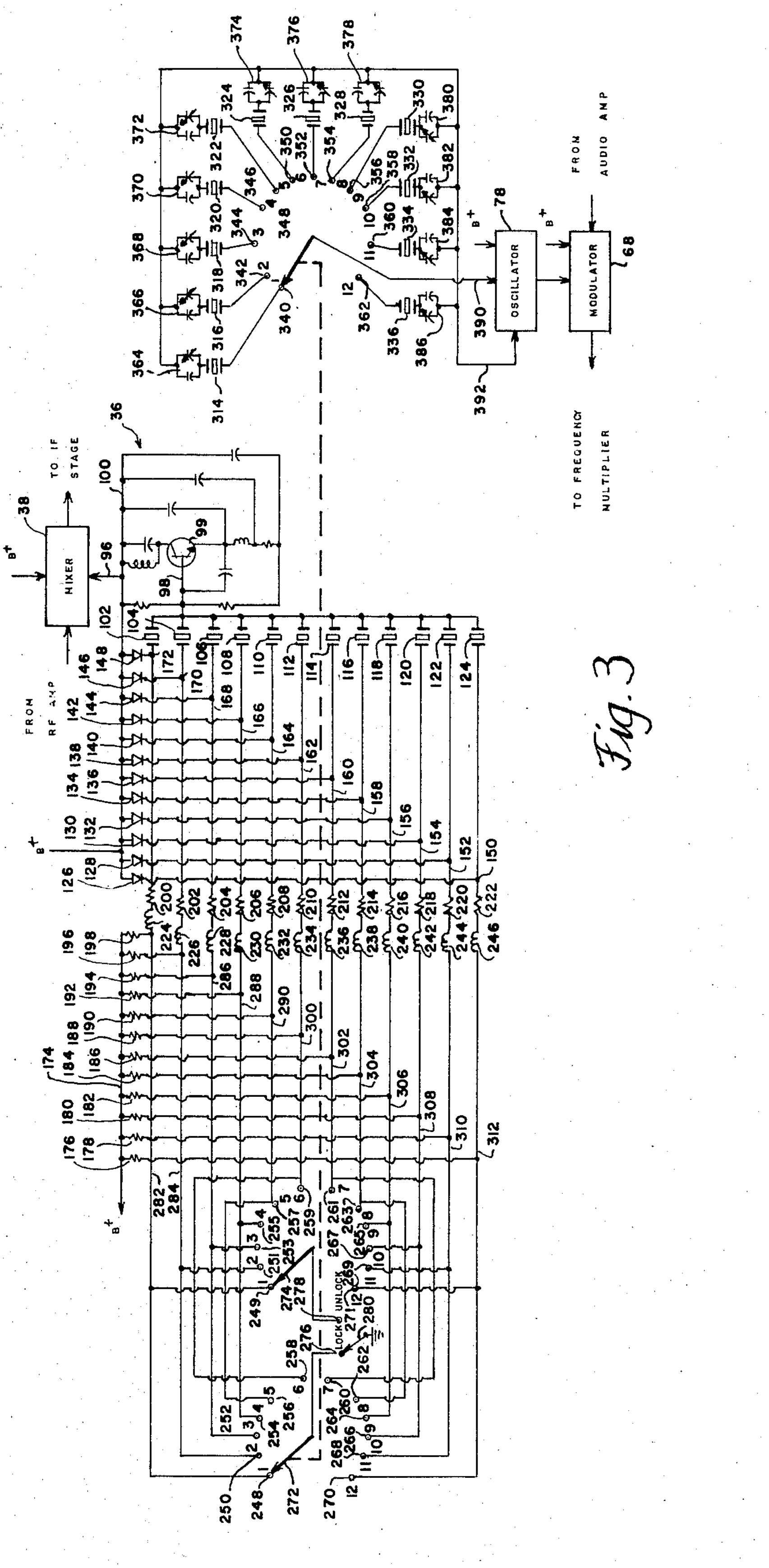
FIG. 3 is a partial schematic and partial block diagram of the present invention.

Referring now to FIG. 3, the invention is illustrated schematically.

Mixer 38 is supplied with a signal of given frequency at input 96 by means of oscillator 36. Oscillator 36 will oscillate at any one of a number of frequencies depending on the value of the crystal placed between base 98 of transistor 99 and AC bus 100. Oscillator 36 is not restricted to that shown in FIG. 3 but may be any oscillator wherein the frequency of oscillation is determined by a frequency resonant element located at some position in the circuit. In oscillator 36, however, the frequency of oscillation is determined by the value of one of crystals 102–124 connected between base 98 and bus 100 in a manner to be described.

Diodes 126–148 are connected between bus 100 and circuit legs 150–172, respectively, and are biased into non-conduction by the DC voltage on bus 174, which sets the DC voltage across diodes 126–148 by means of resistors 176–222. Inductors 224–246 serve to provide the necessary isolation between the crystals by providing a high frequency AC impedance.

RF chokes 224–246 are connected to pairs of switch contacts 248, 249 through 270, 271 respectively and it should be noted that each circuit leg 282–312 has two of the switch contacts 248–271 connected thereto. For example, contacts 254 and 255 are connected at a common point to leg 288. Rotating switch arms 272 and 274 are adapted to sequentially make contact with switch contacts 248, 250, 252, 254, 256, 258, 260, 262, 264, 268, 270 and 249, 251, 253, 255, 257, 259, 261, 263, 265, 267, 269, 271, respectively. Switch arms 272 and 274 are also in electrical contact with mode switch contacts 276 and 278, respectively. Load switch contact arm 280 is permanently connected to ground potential.

The receive channel selector operates as follows.

Either of switch arms 272 or 274 and their associated contacts 248–271 are capable of causing crystals 102–124 to be introduced in the oscillator circuit 36 depending on the position of mode switch 280. If, for example, switch 280 is in its LOCK position in contact with switch arm 272, the switch including arm 272 will be the one which determines which of the crystals 102–124 is to be introduced into the oscillator circuit 36. In this instance, whichever contact 248, 250, 252, 254, 256, 258, 260, 262, 264, 266, 268, 270, which is in contact with switch arm 72, will be placed at ground potential causing its associated diode 126, 128, 130, 132, 134, 136, 138, 140, 142, 144, 146, 148 to be forwardly biased due to the fact that current from bus 174 will flow through the resistor 170–198 which is associated with the grounded circuit leg 282–312. When this occurs, there is insufficient reverse voltage across the appropriate diode 126–148 to cancel the forward bias across the diodes from bus 100. Conduction will then occur thereby effectively connecting one of the crystals 102–124 between bus 100 and transistor base 98. For example, if mode switch 280 is in contact with switch arm 272 and the latter is in contact with switch contact 248, current will flow from bus 174 through resistor 198 causing diode 148 to conduct thereby closing the circuit between crystal 102 and bus 100. This will cause oscillator 36 to oscillate at a frequency determined by the resonant characteristics of crystal 102. It should be noted that RF chokes 224–246 present a high impedance to the frequency of oscillation of oscillator 36 thereby effectively isolating the selected crystal (eg, 102) from the remainder of the crystals (eg, 104–126).

When mode switch 280 is in the LOCK position, the position of switch arm 274 is of no consequence since contact 278 is open circuited and unable to ground any of circuit legs 282–312. When mode switch 280 is in the UNLOCK position, on the other hand, switch 272 will be open circuited at contact 276 and grounding of circuit legs 282–312 can only occur through switch 274. As was the case with switch 272, the circuit leg 282, 284, 286, 288, 290, 300, 302, 304, 306, 308, 310, 312 associated with the contact 249, 251, 253, 255, 257, 259, 261, 263, 265, 267, 269, 271, respectively, which is connected to switch arm 274, will be grounded and its respective diode 126–148 caused to conduct thereby placing one of the crystals 102–104 in the oscillator circuit 36.

As was discussed earlier, modulator 68 is supplied with an AC signal from crystal controlled oscillator 78 which may be any type of crystal controlled oscillator (such as oscillator 36) known in the art. Crystals 314–336 are each connected between bus 338 and successive switch contacts 340–362, respectively, and have trimming circuits 364–386 associated with them to provide a limited degree of fine adjustment. As switch arm 388, which is connected to one of the oscillator leads 890, rotates into successive contact with points 340–362, the crystal 314–362 associated therewith is placed in the series loop formed by lead 390 switch arm 388, bus 338 and second oscillator lead 392. The placing of one of the crystals 314–336 on this loop causes oscillator 76 to oscillate at a particular frequency determined by the resonant characteristics of the selected crystal. It should be noted that the crystal selection arrangement associated with the receive section could be substituted for that of the transmit section.

The receive channel may be selected independently from the transmit channel by placing mode switch 280 in the UNLOCK position in contact with switch arm 274 and then rotating arm 274 to one of its contacts 249–271 to introduce the appropriate crystal 102–124 into the oscillator circuit 36. In like manner, with the mode switch 280 in the UNLOCK position, the transmit channel may be selected by rotating switch arm 388 to one of its contacts 340–362 thereby placing the appropriate crystal 314–336 in the series loop including oscillator lead 390 and 392. If, on the other hand, it is desired to have the receive channel selected automatically when the transmit channel is selected, it is necessary to place mode switch 280 in the LOCK position. Switch arm 272 is mechanically connected or ganged to switch arm 388 in such a manner that it rotates in unison with arm 388. To illustrate, if switch arm 388 is in contact with point 344, switch arm 272 will be in contact with point 252. If switch arm 388 is in contact with point 356, switch arm 272 will be connected to contact 264. Since mode switch 280 is in the LOCK position, switch arm 272 is grounded and will introduce crystals 102–124 into the oscillator circuit 36 as it rotates into contact with its contact points 248–270 in unison with switch arm 388 as the latter is placing crystals 314–336 in the loop of oscillator 78. In this manner, crystals 102 will serve as the receive crystal when crystal 314 is placed in the transmit circuit. Similarly, crystal 104 will be paired with crystal 316, 106 with 318, etc.

It would be obvious to substitute transistor arrangements for diodes 126–148 or electronic switch means for switches 280, 272, 274 or 388 without departing from the present invention.

It should be noted that receive channel selector 58 could be remotely located.

While this invention has been described as having a preferred design, it will be understood that it is capable of further modification. This application is, therefore, intended to cover any variations, uses and/or adaptations of the following and including such departures from the present disclosure as come within known or customary practice in the art to which this invention pertains, and as may be applied to the essential features hereinbefore set forth and fall within the scope of this invention or the limits of the appended claims.

What I claim is:

1. Channel selector means for a transceiver having a transmitter including a modulator and a receiver including a frequency mixer comprising:

a. a first oscillator having an output connected to the mixer, b. first frequency determining means for causing said oscillator to oscillate at one of a first plurality of selected frequencies, c. said first frequency determining means including a first plurality of frequency resonant elements, d. a second oscillator having an output connected to the modulator, e. second frequency determining means for causing said oscillator to oscillate at one of a second plurality of selected frequencies, f. said second frequency determining means including a second plurality of frequency resonant elements, g. selectively operable first selection means for selecting a particular resonant element from said first plurality of frequency resonant elements and when operable to associate said particular resonant element selected thereby with said first oscillator to determine said one of a first plurality of selected frequencies, h. selectively operable second selection means for selecting a particular resonant element from said first plurality of frequency resonant elements and when operable to associate said particular resonant element selected thereby with said first oscillator to determine said one of a first plurality of selected frequencies, i. third selection means for selecting a particular resonant element from said second plurality of frequency resonant elements and associating said particular resonant element selected thereby with said second oscillator to determine said one of a second plurality of selected frequencies, j. switch means for rendering said first selection means operable and said second selection means inoperable when in a first state and said second selection means operable and said first selection means inoperable when in a second state, k. means connected to said second selection means for actuating said second selection means to select a particular resonant element from said first pluraltiy of resonant elements, and l. means connected to said first and third selection means for actuating said first and third selection means in unison to select a particular resonant element from said first and second plurality of frequency resonant elements, respectively.

2. Channel selector means as in claim 1 and wherein:
a. said oscillators are crystal controlled, and
b. said frequency resonant elements are crystals.

3. Channel selector means as in claim 1 and wherein:
a. said first and second selection means include switch means for connecting one of said first plurality of frequency resonant elements to said first oscillator.

4. Channel selector means as in claim 3 and wherein:
a. said last mentioned switch means includes diodes and means for biasing said diodes.

5. Channel selector means as in claim 4 and wherein:
a. said last mentioned switch means includes means for altering the bias on said diodes.

6. Channel selector means as in claim 5 and wherein:
a. said means for altering the bias on said diodes includes a plurality of circuit legs connected at one end to one electrode of said diodes,
b. said first selection means and said second selection means include first contact means and second contact means, respectively, for selectively connecting the other ends of said circuit legs to said first mentioned switch means.

7. Channel selector means as in claim 6 and wherein:
a. said first mentioned switch means includes means for grounding said other ends of said circuit legs either through said first contact means or said second contact means to render said first selection means or said second selection means, respectively, operable.

8. Channel selector means as in claim 7 and wherein:
a. said third selection means includes switch means for connecting one of said second plurality of frequency resonant elements to said second oscillator, and
b. said first and last mentioned switch means are mechanically ganged.

9. Channel selector means as in claim 3 and wherein:
a. said first, second and third selection means each includes stepping switch means.

10. Channel selector means as in claim 9 and wherein:
a. said stepping switch means associated with said first and third selection means are mechanically ganged.

11. Channel selector means as in claim 3 and wherein:
a. said last mentioned switch means is electronic in nature.

12. Channel selector means for a transceiver including a transmitter section and a receiver section comprising:
a. a first crystal controlled oscillator operatively associated with the receiver,
b. a first plurality of crystals,
c. first selection means for connecting one of said crystals to said oscillator operatively for frequency control,
d. a second crystal controlled oscillator associated with the transmitter,
e. a second plurality of crystals,
f. second selection means for connecting one of said last mentioned crystals to said second oscillator for frequency control,
g. said first selection means including first multiple position switch means and second multiple position switch means,
h. bi-state mode switch means for alternatively rendering one of said multiple position switch means operable to cause one of said first plurality of crystals to be connected to said first oscillator and render the other of said multiple position switch means inoperable to cause one of said first plurality of crystals to be connected to said first oscillator,
i. said second selection means including third multiple position switch means for causing one of said second plurality of crystals to be connected to said second oscillator, and
j. means for causing said third switch means and said first switch means to move to successive positions in unison.

13. Channel selection means for a multi-channel transceiver comprising:
a. first selection means for selecting a transmit channel from a first plurality of channels,
b. second selection means for selecting a receive channel from a second plurality of channels,
c. means for actuating one of said selection means to select a channel,
d. means for actuating the other of said selection means to select a channel, and
e. said means for actuating one of said selection means including selectively operable means for actuating said the other of said selection means when said one of said selection means is actuated.

14. Channel selection means for a multi-channel transceiver comprising:
a. transmit selection means for selecting a transmit channel from a first plurality of channels,
b. receive selection means for selecting a receive channel from a second plurality of channels,
c. first means for actuating one of said selection means to select a channel,
d. selectively operable second means for actuating the other of said selection means to select a channel, and
e. said first means including selectively operable means for actuating said the other of said selection means to select a channel in unison with said one of said selection means and rendering said second means inoperable to actuate said the other of said selection means to select a channel.

* * * * *